United States Patent [19]

Oehlke

[11] 4,440,535
[45] Apr. 3, 1984

[54] SHEET METAL FASTENER

[75] Inventor: Donald N. Oehlke, Troy, Mich.

[73] Assignee: Eaton Corporation, Cleveland, Ohio

[21] Appl. No.: 263,526

[22] Filed: May 14, 1981

[51] Int. Cl.³ .............................................. F16B 37/04
[52] U.S. Cl. .................................... 411/112; 411/174;
411/437; 411/524
[58] Field of Search ........ 411/166, 167, 170, 172–175,
411/427, 432, 437, 520, 522–529, 61, 112

[56]  References Cited

U.S. PATENT DOCUMENTS

| | | | |
|---|---|---|---|
| 1,243,859 | 10/1917 | Neider | 411/437 |
| 2,062,685 | 12/1936 | Tinnerman | 411/174 |
| 2,581,288 | 1/1952 | Pletcher, Jr. | 411/520 |
| 2,797,720 | 7/1957 | Mann | 411/175 |
| 3,308,708 | 3/1967 | Holton | 411/437 |

FOREIGN PATENT DOCUMENTS 580375  9/1946  United Kingdom ................ 411/167

Primary Examiner—Gary L. Smith
Assistant Examiner—Neill Wilson
Attorney, Agent, or Firm—C. H. Grace; H. D. Gordon

[57]  ABSTRACT

A sheet metal fastener (100) preferably for self retention to a panel (112) having a slotted aperture (130) therethrough and for receipt of an externally threaded fastener (136) is provided. The fastener defines a first (114) and second (126) thread engaging slot for engagement of externally threaded fasteners at two axially spaced external threads.

5 Claims, 7 Drawing Figures

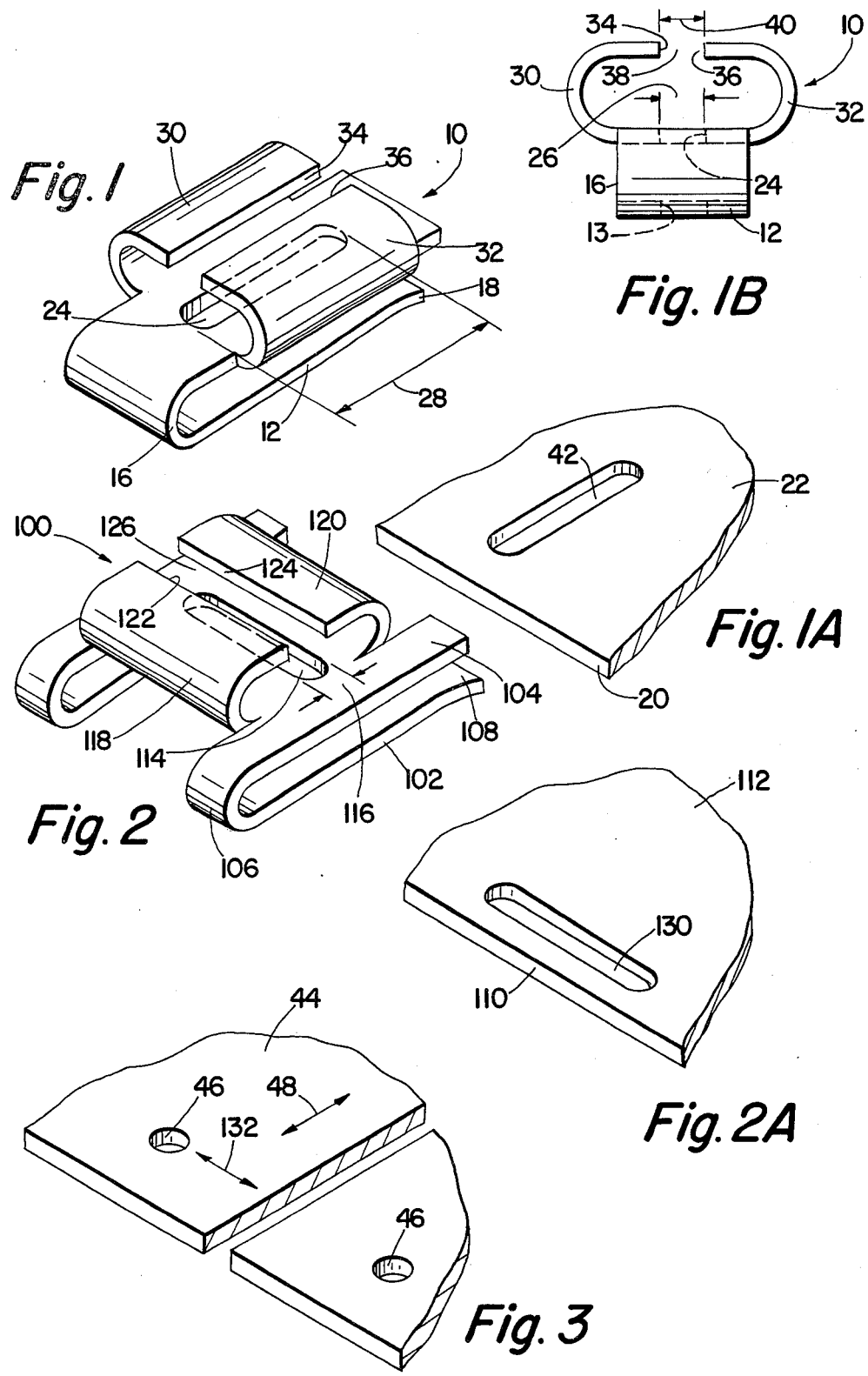

SHEET METAL FASTENER

BACKGROUND OF THE INVENTION

1. Field of the Invention

This invention relates to a one-piece, stamped, sheet metal fastener for receiving and threadably engaging the external threads of an externally threaded fastener such as a screw or bolt and more more particularly to a sheet metal fastener defining two axially spaced, elongated thread engaging slots adapted to engage two threads of a bolt or screw.

2. Description of the Prior Art

Stamped, sheet metal fasteners adapted to receive and engage one or more of the external threads, or helix, of a bolt or screw are well known in the prior art. Typically, as may be seen by reference to U.S. Pat. No. 2,239,797 and U.S. RE Pat. No. 21,769, both of which are hereby incorporated by reference, the sheet metal fasteners adapted to receive and engage two or more of the external threads of a bolt or screw utilized two or more arm members, in addition to a base member, each of which members defined two or more contoured thread impressions. While such prior art devices were and are widely used as they allow a bolt or screw to be retained under greater tension than is possible with a single thread impression stamped fastener of equal gauge, they were not totally satisfactory as providing the two arm members with thread impressions formed therein required additional material and/or a more complicated forming operation and/or such fasteners require the received and retained fastener to be relatively accurately aligned with the spaced apart thread impressions and/or did not allow adjustment of one retained member relative to another retained member.

SUMMARY OF THE INVENTION

In accordance with the present invention, the drawbacks of the prior art have been minimized or overcome by the provision of a stamped, one-piece sheet metal fastener defining two axially spaced, aligned, elongated thread receiving slots for receipt and engagement of an axially separated two of the external threads of a bolt or screw. The above is accomplished by providing a sheet metal fastener having a base portion defining a first elongated thread receiving slot therein and two arm portions, extending generally upwardly and inwardly from opposite ends of the base portion and terminating at opposed generally straight edges defining a second, elongated, open ended thread receiving slot therebetween generally aligned with the first slot in the base portion. Clip attachment means may be provided for self retention of the fastener to an apertured or slotted panel as is well known in the art. The first and second thread receiving slots are of a length greater than the major diameter of the bolt thread to be received and of a width adapted to threadably engage the external thread of the received externally threaded fastener.

Accordingly, it is an object of the present invention to provide a new and improved sheet metal fastener.

Another object of the present invention is to provide a sheet metal fastener defining a first and a second axially spaced, aligned thread receiving slots for receipt and engagement of an externally threaded fastener.

These and other objects and advantages of the present invention will become apparent from a reading of the detailed description of the preferred embodiments taken in view of the accompanying drawings.

BRIEF DESCRIPTION OF THE DRAWINGS

FIG. 1 is a perspective view of one embodiment of the present invention.

FIG. 1A is a perspective view of a slotted panel onto which the fastener of FIG. 1 is self retainingly mountable.

FIG. 1B is an end view of the fastener of FIG. 1.

FIG. 2 is a perspective view of an alternate embodiment of the present invention.

FIG. 2A is a perspective view of a slotted panel onto which the fastener of FIG. 2 is self retainingly mountable.

FIG. 3 is a perspective view of an aperatured panel to which the panels of FIG. 1A or FIG 2A are to be adjustably fastened utilizing the fasteners of FIGS. 1 and 2, respectively.

DESCRIPTION OF THE PREFERRED EMBODIMENT

Figure 4:
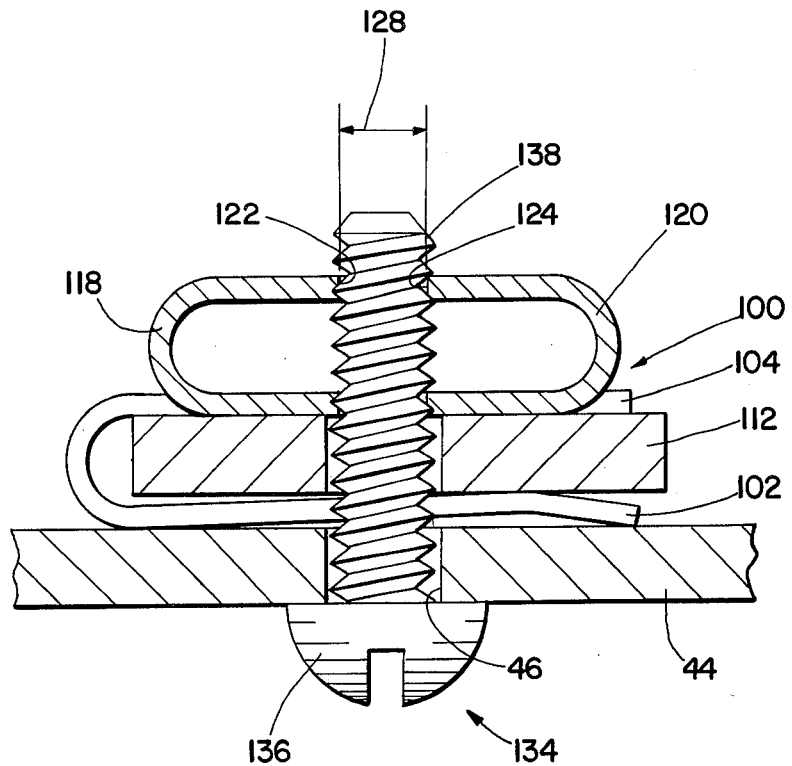
FIG. 4 is a front elevational view, partially in section, of the panels of FIGS. 2A and 3 joined utilizing the fastener of FIG. 2 and a screw.

Certain terminology will be used in the following description for convenience in reference only and will not be limiting. The words "upwardly" and "downwardly" will refer to directions in the drawings to which reference is made. The words "inwardly" and "outwardly" will refer to directions toward and away from, respectively, the geometric center of the device or designated parts thereof. The word "axially" will refer to the direction along the rotational axis of the externally threaded fastener received, or to be received, by the sheet metal fasteners of the present invention. Said terminology will include the words above specifically mentioned, derivatives thereof and words of similar import.

The sheet metal fastener 10 of the present invention may be seen by reference to FIGS. 1 and 1B. Sheet metal fastener 10 comprises a sheet metal strip, preferably of spring steel, which is bent backwards upon itself to define a generally "U" shape in cross section comprising a leg portion 12 and a base portion 14 joined by a bight portion 16. Preferably, the remote end 18 of leg 12 is flared outwardly and downwardly to allow the fastener 10 to be slipped over a panel edge, such as edge 20 of panel 22. Preferably, as is well known in the art, the base 14 and leg 12 will resiliently retain the panel 22 therebetween for self mounting of the fastener 10 to the panel 22. As is well known in the art, and as shown in FIG. 1B at 13, leg 12 is provided with an aperture or is split. A better appreciation of the structure of leg 12 may be had by reference to U.S. Pat. No. 4,200,027 hereby incorporated by reference.

The base portion 14 is generally rectangular and is provided with a thread receiving slot 24 extending generally parallel to the length of the base portion. The thread receiving slot 24 is of a width 26 adapted to threadably engage the external threads of a received screw or bolt and of a length 28 substantially greater than the width. Alternatively, slot 24 could be open ended at either end thereof.

A pair of arm members, 30 and 32, extend upwardly and then inwardly from opposite sides of the base portion and terminate at opposed, substantially parallel, substantially straight edges 34 and 36, respectively. The opposed edges 34 and 36 define an open ended slot 38 therebetween of a width 40 adapted to threadably receive and engage the external threads of a received screw or bolt. Open ended slot 38 is axially spaced from, and generally aligned with, slot 24 and provides a second thread engaging structure for engagement of the external threads of a received screw or bolt.

Panel 22 is provided with a through slot 42 extending generally transverse to edge 20. Fastener 10 is mountable on panel 22 such that slots 24 and 38 will generally align with slot 42. Accordingly, a screw or bolt may pass through slot 42 and be retained on the external threads thereof by the thread receiving and engaging slots 24 and 38 of fastener 10 at various positions along the length of the slots. Preferably, slot 42 is of a length generally equal to the length 28 of slot 24 and of a width greater than the major diameter of the external threads of the externally threaded fastener to be received therethrough. The above structure will allow fastener 10 to be self retainingly received on panel 22 and will allow panel 22 to be fastened to a second panel, such as panel 44 seen in FIG. 3 having one or more apertures 46 through which a shank of a screw or bolt may be received, with a certain degree of misalignment. Additionally, in situations wherein a plurality of fasteners 10 are utilized in connection with a panel such as panel 22 having a plurality of slots 42, to join such a panel 22 to a panel 44 having a plurality of spaced apertures 46 through which extend the shanks of bolts or screws, panel 22 may be selectively adjusted in the direction of arrow 48 relative to panel 44.

An alternate embodiment 100 of the present invention may be seen by reference to FIG. 2. The sheet metal fastener 100 comprises a sheet metal strip, preferably of spring steel, which is bent backwards upon itself to define a generally "U" shaped in cross section comprising a leg 102 and a base 104 joined by a bight portion 106. Preferably, the remote end 108 of leg 102 is flared downwardly and outwardly to allow the fastener 100 to be slipped over and resiliently retained over a panel edge, such as edge 110 of panel 112. The base portion 104 is provided with a thread receiving slot 114 extending generally transverse to the length of the base. The thread receiving slot is of a width 116 adapted to threadably engage the external threads of a received screw or bolt and is of a length substantially greater than the width.

A pair of arm members, 118 and 120, extend upwardly and then inwardly from opposite edges of the base and terminate at opposed substantially parallel, substantially straight edges 122 and 124, respectively. The opposed edge 122 and 124 define an open ended slot 126 therebetween of a width 128 adapted to threadably engage the external threads of a received screw or bolt. Open ended slot 126 is axially spaced from and generally aligned with, slot 114 and provides a second thread engaging structure for engagement of the external threads of a received screw or bolt.

Panel 112 is provided with a through slot 130 extending generally parallel to edge 110. Fastener 100 is mountable on panel 112 such that slot 114 and 126 will generally along with slot 130 in panel 112. Accordingly, if a plurality of fasteners 100 are utilized with a panel 112 having a plurality of slots 130 provided therein to mount panel 112 to a panel 44 having a a plurality of apertures 46 therethrough through which extend the shanks of externally threaded members, the panel 112 may be adjusted in the direction of 132 relative to panel 44.

Reference to FIG. 4 will illustrate an adjustable joint comprising panels 44 and 112 which are coupled by means of the fastener 100 of the present invention and a conventional externally threaded screw or bolt 134. Screw 134 comprises a headed portion 136 of transverse dimension preventing passage thereof through aperture 46 of panel 44 and an externally threaded shank portion 138 of a diameter allowing passage through aperture 44. As may be seen, the external threads on the shank portion will threadably engage slot 114 in base 104 and slot 126 defined by the arms 118 and 120.

Although the present invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A one-piece, self-retaining sheet metal fastener for substantially fixed mounting to a panel having a slotted aperture therethrough and for receiving and retaining a rotationally tightened externally threaded fastener, said sheet metal fastener formed from a strip of sheet metal the thickness of which is less than the pitch distance of the external threads of the externally threaded fastener, said sheet metal fastener comprising generally parallel leg and base portions joined by bight portion for resilient receipt of an edge of the panel therebetween, said base portion being generally flat and defining a first thread engaging elongated slot therethrough, said first slot defined by a pair of substantially parallel substantially straight first edges spaced apart by a distance less than the major diameter of the externally threaded fastener, a pair of arm portions extending upwardly and then inwardly from opposite edges of said base portion, said arm portions terminating at opposed substantially parallel substantially straight second edges spaced apart by a distance less than the major diameter of the external threads of the externally threaded fastener to define a second thread engaging elongated slot therebetween, said second thread engaging slot spaced from and generally aligned with said first thread engaging slot.

2. The sheet metal fastener of claim 1, wherein said first thread engaging slot is of a length at least twice as great as the width thereof.

3. The sheet metal fastener of claim 2, wherein said slotted aperture in said panel extends generally transverse to the panel edge received between said leg and base portions, said first thread receiving slot in said base portion extends generally in the direction transverse the bight portion and said arm portions extend from the edges of the base portion transverse the bight portion.

4. The sheet metal fastener of claim 2, wherein said slotted aperture in said panel extends generally parallel to the panel edge received between said leg and base portions, said first thread receiving slot in said base portion extends generally parallel to the bight portion and said arm portions extend from the edges of the base portion adjacent to and remote the bight portion.

5. A one-piece, sheet metal nut for threadably receiving and retaining the threads of an externally threaded fastener, said nut formed from a strip of sheet metal having a thickness less than the pitch distance of the external threads of the externally threaded fastener to be received, said nut comprising a generally flat base portion having a first thread engaging elongated slot therein, said first slot defined by a pair of substantially parallel substantially straight first edges spaced apart by a distance less than the major diameter of the externally threaded fastener, and a pair of arm portions extending upwardly and inwardly from opposite edges of said base portion, said arm portions terminating at generally straight, generally parallel opposed second edges spaced apart by a distance less than the major diameter of the externally threaded fastener to define a second thread engaging elongated slot therebetween, said second slot spaced from and aligned with said first slot.

* * * * *